United States Patent [19]

Esneault

[11] 4,434,282
[45] Feb. 28, 1984

[54] PROCESS FOR POLYMERIZING OLEFINS

[75] Inventor: Calvin P. Esneault, Baton Rouge, La.

[73] Assignee: The Dow Chemical Company, Midland, Mich.

[21] Appl. No.: 432,609

[22] Filed: Oct. 4, 1982

[51] Int. Cl.³ .......................... C08F 4/02; C08F 10/00
[52] U.S. Cl. .................... 526/125; 502/153; 526/124; 526/142; 526/352
[58] Field of Search .................. 526/124, 142, 125

[56] References Cited

U.S. PATENT DOCUMENTS

| | | | |
|---|---|---|---|
| 2,956,993 | 10/1960 | Nowlin et al. | 260/94.9 |
| 3,334,079 | 8/1967 | Ralch | 260/93.7 |
| 3,478,008 | 11/1969 | Ledbetter | 260/93.7 |
| 3,644,318 | 2/1972 | Diedrich et al. | 260/88.2 |
| 3,878,124 | 4/1975 | Durand et al. | 252/429 B |
| 3,901,863 | 8/1975 | Berger et al. | 260/88.2 R |
| 3,951,935 | 4/1976 | Engelmann | 526/129 |
| 3,960,765 | 6/1976 | Shiga et al. | 252/429 B |
| 4,004,071 | 1/1977 | Aishima et al. | 526/116 |
| 4,006,101 | 2/1977 | Matsuura et al. | 252/429 C |
| 4,027,089 | 5/1977 | Aishima et al. | 526/127 |
| 4,039,472 | 8/1977 | Hoff | 252/429 C |
| 4,063,009 | 12/1977 | Ziegler et al. | 526/159 |
| 4,067,822 | 1/1978 | Gessell et al. | 252/429 B |
| 4,071,672 | 1/1978 | Kashiwa | 526/122 |
| 4,083,802 | 4/1978 | Matsuura et al. | 252/429 C |
| 4,085,276 | 4/1978 | Toyota et al. | 526/122 |
| 4,104,198 | 8/1978 | May, Jr. et al. | 252/429 B |
| 4,115,319 | 9/1978 | Scata et al. | 252/429 B |
| 4,120,820 | 10/1978 | Birkelbach | 252/429 B |
| 4,120,883 | 10/1978 | Sakurai et al. | 260/448 A |
| 4,136,058 | 1/1979 | Harris et al. | 252/429 B |
| 4,187,385 | 2/1980 | Iwao et al. | 526/128 |
| 4,199,476 | 4/1980 | Melquist et al. | 252/431 R |
| 4,244,838 | 1/1981 | Gessell | 526/142 |
| 4,246,383 | 1/1981 | Gessell | 526/92 |
| 4,283,525 | 8/1981 | Rao | 528/489 |
| 4,295,992 | 10/1981 | Gibbs | 252/429 C |

FOREIGN PATENT DOCUMENTS

| | | | |
|---|---|---|---|
| 845983 | 3/1977 | Belgium . | |
| 942734 | 2/1974 | Canada | 252/20 |
| 992051 | 6/1976 | Canada | 252/20 |
| 2758312 | 7/1978 | Fed. Rep. of Germany . | |
| 51-102086 | 9/1976 | Japan . | |
| 51-111281 | 10/1976 | Japan . | |
| 51-148785 | 12/1976 | Japan . | |
| 52-98076 | 8/1977 | Japan . | |
| 762246 | 3/1977 | South Africa | 252/429 B |
| 1235062 | 6/1971 | United Kingdom . | |
| 1275641 | 5/1972 | United Kingdom . | |
| 1306001 | 2/1973 | United Kingdom . | |
| 1311013 | 3/1973 | United Kingdom . | |
| 1315770 | 5/1973 | United Kingdom . | |
| 1321766 | 6/1973 | United Kingdom . | |
| 1343781 | 1/1974 | United Kingdom . | |
| 1357474 | 6/1974 | United Kingdom . | |
| 1358437 | 7/1974 | United Kingdom . | |
| 1444736 | 8/1976 | United Kingdom . | |
| 1492379 | 11/1977 | United Kingdom . | |
| 1500873 | 2/1978 | United Kingdom . | |
| 1502567 | 3/1978 | United Kingdom . | |
| 1504930 | 3/1978 | United Kingdom . | |
| 1547269 | 6/1979 | United Kingdom . | |
| 2016020 | 9/1979 | United Kingdom . | |
| 1554248 | 10/1979 | United Kingdom . | |
| 2020672 | 11/1979 | United Kingdom . | |

OTHER PUBLICATIONS

"Ethylene Polymerization Process With a Highly Active Ziegler-Natta Catalyst: 1. Kinetics", L. L. Bohm, Polymer, vol. 19, May, 1978, pp. 553-561.

Primary Examiner—Edward J. Smith
Attorney, Agent, or Firm—J. G. Carter

[57] ABSTRACT

Olefins are polymerized in the presence of (I) solid supported catalysts which are prepared by (A) reacting in the presence of a diluent such as n-hexane a mixture of (1) the reaction product of (a) an organomagnesium compound such as dibutyl magnesium and (b) a diol such as 1,8-octanediol and (2) a transition metal halide such as titanium tetrachloride and (B) recovering the solid precipitate such as by decanting and (C) washing the solid with a solvent such as n-hexane and (II) a suitable activating agent. The resultant polymers have a relatively broad molecular weight distribution.

17 Claims, No Drawings

PROCESS FOR POLYMERIZING OLEFINS

BACKGROUND OF THE INVENTION

This invention relates to a new catalyst composition useful for initiating and promoting polymerization of α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IV-B, V-B, VI-B AND VIII of Mendeleeve's Periodic Table of Elements with an organometallic compound. Generally the halides, oxyhalides and alkoxides or esters of titanium, vanadium, and zirconium are the most widely used transition metal compounds. Common examples of the organometallic compounds include the hydride, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agents such as an aqueous basic solution. Such catalyst deactivation and/or removal procedures are expensive both in time and material consumed as well as the equipment required to carry out such treatment.

Moreover, most slurry polymerization processes employing the aforementioned known catalyst systems are accompanied by reactor-fouling problems. As a result of such reactor fouling, it is necessary to frequently stop the process to clean the polymerization reactor.

In view of the foregoing problems encountered in the use of conventional Ziegler catalyst, it would be highly desirable to provide a polymerization catalyst which is sufficiently active to eliminate the need for catalyst residue removal and which minimizes reactor fouling problems. In slurry polymerization processes, it would be especially desirable to provide a high efficiency catalyst that would yield a polyolefin powder having an unsettled bulk density of 20–35 pounds per cubic foot.

This has been accomplished by the catalysts disclosed in U.S. Pat. No. 4,244,838 issued to D. E. Gessell, which solid supported catalysts are prepared by (A) reacting in the presence of a diluent such as n-hexane a mixture of (1) the reaction product of (a) an organomagnesium compound such as a dibutyl magnesium; and (b) at least one of water, carbon dioxide or an organic, oxygen-containing compound such as n-propyl alcohol; and (2) a transition metal halide such as titanium tetrachloride; and (B) recovering the solid precipitate such as by decanting; and (C) washing the solid with a solvent such as n-hexane. The resultant solid supported catalyst contains sufficient transition metal which, when activated with a suitable activating agent, serves as a polymerization catalyst for α-olefins. Polymers prepared employing these catalysts have a relatively narrow molecular weight distribution.

The present invention solves the aforementioned problems while providing polymers having a relatively broad molecular weight distribution.

SUMMARY OF THE INVENTION

The present invention in one aspect is the hydrocarbon insoluble solid catalytic reaction product of (1) the reaction product of (a) a hydrocarbyl magnesium compound or a hydrocarbyl or hydrocarbyloxy aluminum, zinc or boron mixture or complex thereof with (b) at least one diol having at least 6 carbon atoms and wherein there are at least three carbon atoms between the hydroxyl groups of said diol(s); and (2) a halide-containing transition metal compound or mixture thereof.

The components are employed in quantities such that the mole ratio of component (1-a) to component (1-b) is about 1:1. A sufficient quantity of halide-containing transition metal compound is employed so as to convert substantially all of the organic groups attached to a magnesium in component (1) to a halide group. The halogen:Mg ratio is usually from about 500:1 to about 2:1, preferably from about 100:1 to about 3:1 and most preferably from about 50:1 to about 4:1. The Mg:Ti ratio is usually from about 0.01:1 to about 1.5:1, preferably from about 0.1:1 to about 1:1.

The present invention in another aspect is the solid catalyst obtained from contacting the above solid supported catalyst with an activating agent.

The present invention also concerns a process for preparing a hydrocarbon insoluble solid catalyst which process comprises (A) reacting in the presence of an inert diluent (1) the reaction product of (a) a magnesium component or mixture of such components, represented by the formula $MgR_2 \cdot xMeR'_{x'}$, wherein each R is independently a hydrocarbyl group having from 1 to about 20, preferably from 1 to about 10 carbon atoms, each R' is independently a hydrocarbyl or a hydrocarbyloxy group having from 1 to about 20, preferably from 1 to about 10 carbon atoms, Me is aluminum, zinc or boron, x has a value of from zero to about 10 and x' has a value equal to the valence of Me; with (b) at least one diol having at least 6 carbon atoms and wherein there are at least three carbon atoms between the hydroxyl groups of said diol(s); and wherein components (1-a) and (1-b) are present in a molar ratio of about 1:1; with (2) a halide-containing transition metal compound or mixture thereof represented by the formula $TmY_nX_{z-n}$ wherein Tm is a metal selected from groups IV-B, V-B AND VI-B of the Periodic Table of Elements, Y is oxygen or OR", each X is a halogen, each R" is independently a hydrocarbyl group having from 1 to about 20 carbon atoms, z has a value equal to the valence of said transition metal, n has a value of from zero to 6 with the value of $z-n$ being from at least 1 up to a value equal to the valence of the transition metal; said halide-containing transition metal being present in a quantity so as to convert substantially all of the substituent groups attached to a magnesium atom in component (1) to a halide group;

(B) recovering the resultant hydrocarbon insoluble reaction product therefrom;

(C) reacting said hydrocarbon insoluble reaction product with an activating agent represented by the formulas $AlR^3{}_{3-m}X_m$, $ZnR^3{}_2$ $ZnR^3X$, $MgR''X$ or $MgR^3{}_2$ including mixtures thereof, wherein each $R^3$ is independently a hydrocarbyl group, X is a halogen, preferably chlorine or bromine, or a hydrocarbyloxy group, m has a value from zero to 2, preferably zero or 1 and most preferably zero in a quantity so as to provide an Al, Zn and/or Mg:Tm ratio of from about 1:1 to about 5000:1, preferably from 5:1 to about 1000:1 and most preferably from 10:1 to about 400:1.

Another aspect of the invention is a process for polymerizing α-olefins or mixtures thereof which comprises conducting the polymerization in the presence of the aforementioned catalysts.

DETAILED DESCRIPTION OF THE PREFERRED EMBODIMENTS

The organomagnesium compounds which are suitably employed in the present invention include those represented by the formula $R_2Mg \cdot xMeR'_{x'}$, wherein each R is independently a hydrocarbyl group, each R' is independently a hydrocarbyl or hydrocarbyloxy group, Me is aluminum, zinc or boron and x' has a value equal to the valence of the metal Me.

The term hydrocarbyl as employed herein refers to a monovalent and, in some instances, a divalent hydrocarbon radical such as alkyl, cycloalkyl, aryl, aralkyl, alkenyl and similar hydrocarbon radicals having from 1 to about 20 carbon atoms with alkyl having from 1 to 10 carbon atoms being preferred.

The term hydrocarbyloxy as employed herein refers to monovalent oxyhydrocarbon radicals such as alkoxy, cycloalkoxy, aryloxy, aralkoxy, alkenoxy and similar oxyhydrocarbon atoms having from 1 to about 20 carbon atoms with alkoxy groups having from 1 to 10 carbon atoms being the preferred hydrocarbyloxy radicals.

The quantity of $MeR'_{x'}$, i.e. the value of x, is preferably from the minimum amount which is sufficient to render the magnesium compound soluble in the inert solvent or diluent which is usually a hydrocarbon or mixture of hydrocarbons up to a value of about 10. The value of x therefore is from zero to about 10, usually from zero to about 2, preferably from about 0.2 to about 1. Most preferably, the value of x is such that the reaction product (1) is hydrocarbon soluble.

Particularly suitable organomagnesium compounds include, for example, di-(n-butyl)magnesium, n-butyl-sec-butylmagnesium, diisopropylmagnesium, di-n-hexylmagnesium, isopropyl-n-butylmagnesium, ethyl-n-hexylmagnesium, ethyl-n-butylmagnesium, di-n-butylmagnesium.½ triisobutylaluminum, di-(n-butyl)magnesium.1/6 triethylaluminum, dibutylmagnesium.2 triisobutylaluminum, butyl-octylmagnesium, dihexylmagnesium.½ triisobutylaluminum, butylethylmagnesium.½ triisobutylaluminum, butyloctylmagnesium.½ triisobutylaluminum, mixtures thereof and the like.

Suitable diols include those saturated aliphatic diols having at least 6 carbon atoms and at least three, preferably between three and twenty, and more preferably between three and eight carbon atoms between the hydroxyl groups. The diols can be either linear or branched. Particularly suitable diols include, for example, 1,8-octanediol and 2-methyl-2,4-pentanediol.

Suitable halide-containing transition metal compounds which can be employed include those compounds represented by the formula $TmY_nX_{z-n}$ wherein Tm is a transition metal selected from groups IV-B, V-B and VI-B of the Periodic Table of the Elements, Y is oxygen or OR", each R" is independently a hydrocarbyl group as previously defined, X is a halogen, preferably chlorine or bromine, z has a value corresponding to the valence of the transition metal, Tm, n has a value of from zero to 6 with the value of $z-n$ being from at least 1 up to a value equal to the valence state of the transition metal, Tm.

Particularly suitable are the hydrocarbon soluble transition metal compounds such as, for example, titanium tetrachloride, titanium tetrabromide, dibutyoxytitanium dichloride, monoethoxytitanium trichloride, vanadium oxytrichloride, vanadium tetrachloride, chromium trichloride, mixtures thereof and the like.

Suitable organic inert diluents in which the catalysts can be prepared and in which the α-olefin polymerizatin can be conducted include, for example, liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, especially those having boiling points in the range from about −50° C. to about 200° C. Also included as suitable inert diluents are benzene, toluene, ethylbenzene, cumene, decalin and the like. Most suitable are the hydrocarbons having from 4 to about 10 carbon atoms.

The catalysts of the present invention are advantageously prepared under an inert atmosphere such as nitrogen, argon or other inert gas at temperatures in the range of from about 0° C. to about 200° C., preferably, for convenience, from about 0° C. to about 100° C. The time of mixing the various components is not critical; however, times of from about 5 minutes to about 2 hours are deemed to be most desirable. Rapid mixing of the catalyst components or poor agitation produces a catalyst which is relatively non-uniform with respect to particle size distribution and produces polymers having an undesirably broad particle size distribution.

The magnesium compound, the optional aluminum compound, and the water, carbon dioxide or organic oxygen-containing compound may be mixed in any order of addition. A gelatinous precipitate forms when the oxygen-containing compound and magnesium compound are mixed and lumps will form if the reactants are mixed either with poor agitation, too rapidly or in too concentrated a mixture. These lumps result in a final catalyst which contains lumps which in turn produces a polymer under slurry polymerization conditions having an undesirably broad particle size distribution with a significant percentage of particles unable to pass through a 40 mesh screen. Addition of an aluminum compound results in a hydrocarbon solution of the magnesium compound and oxygen-containing compound mixture and eliminates these previously mentioned undesirable effects. It is preferable to add the oxygen-containing compound to a solution of the magnesium compound and the aluminum compound so as to obtain a desirably uniform polymer particle size distribution.

When the catalysts of this invention are used in solution polymerization conditions the above mentioned catalyst particle size distribution the above mentioned catalyst particle size distribution is not as important; however, if an aluminum compound is added as a solubilizing agent the catalyst preparation is simplified when using closed metal vessels for the catalyst preparation, such as would be used in the commercial production of polymers and copolymers of ethylene.

Suitable activating agents or catalysts with which the supported catalysts of the present invention can be reacted, contacted or employed in the polymerization of α-olefins include those aluminum, zinc or magnesium compounds represented by the formulas $AlR^3{}_{3-m}X_m$, $ZnR^3{}_2$, $ZnR^3X$, $MgR^3X$ or $MgR^3{}_2$ including mixtures thereof wherein each $R^3$ is independently a hydrocarbyl group as hereinbefore defined, X is a halogen, preferably chlorine or bromine, or a hydrocarbyloxy group as hereinbefore defined, m has a value of from zero to 2, preferably zero or 1 and most preferably zero.

Particularly suitable activating agents or cocatalysts include, for example, diethylaluminum chloride, diethylaluminum bromide, triethylaluminum, triisobutylaluminum, diethylaluminum ethoxide, dibutylmagnesium, mixtures thereof and the like.

The activators are employed in quantities such that the Al, Mg and/or Zn:Tm atomic ratio is from about 1:1 to about 5000:1, preferably from about 5:1 to about 1000:1 and most preferably from about 10:1 to about 400:1.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with other α-olefins and/or with small amounts i.e., up to about 25 weight percent based on the polymer of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40, weight percent of propylene, butene-1, hexene-1, octene-1, 4-methylpentene-1, 1,7-octadiene or similar α-olefin or α-diolefin based on total monomer.

α-olefins may be polymerized by employing mixtures of the herein described catalyst support with the herein described reducing cocatalysts. The polymerization can be conducted by either (1) reacting said support and said cocatalyst prior to addition to the polymerization reactor, (2) adding to the reactor a mixture of the two components or (3) adding the two components separately to the polymerization reactor or combinations thereof.

In the polymerization process employing the aforementioned catalyts, polymerization is effected by adding a catalytic amount of the above catalyst composition to a polymerization zone containing α-olefin monomer, or vice versa. The polymerization zone is maintained at temperatures in the range from about 0° C. to about 300° C., preferably from about 40° C. to about 90° C., for a residence time of about 30 minutes to several hours, preferably 1 hour to 4 hours. It is desireable to carry out the polymerization in the absence of moisture and oxygen and a catalytic amount of the catalytic reaction product is generally within the range from about 0.0001 to about 0.01 milligram-atoms transition metal per liter of diluent. It is understood, however, that the most advantageous catalyst concentration will depend upon polymerization conditions such as temperature, residence time, pressure, diluent and presence of catalyst poisons and that the foregoing range is given to obtain maximum catalyst yields. Generally, in the polymerization process, a carrier which may be an inert organic diluent or excess monomer is employed. In order to realize the full benefit of the high efficiency catalyst of the present invention, care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that suitable inert diluents employed in the polymerization recipe are as defined as hereinbefore for use in preparation of the catalyst.

The polymerization pressures preferably employed are relatively low i.e., from about 50 to about 500 psig. However, polymerization within the scope of the present invention can occur at pressures from atmospheric up to pressures determined by the capabilities of the polymerization equipment. During polymerization it is desirable to mix the polymerization recipe to obtain better temperature control and to maintain uniform polymerization mixtures throughout the polymerization zone.

In order to optimize catalyst yields in the polymerization of ethylene at solution polymerization conditions, it is preferred to maintain an ethylene concentration in the solvent in the range from about 0.1 to about 10 weight percent. To achieve this concentration when an excess of ethylene is fed into the system, a portion of the ethylene can be vented. Hydrogen is often employed in the practice of this invention for lower molecular weight of the resultant polymer. For the purpose of this invention, it is beneficial to employ hydrogen in concentrations ranging from about 0 to about 80 volume percent in the gas phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general methods described herein, the polymerization reactor can be operated liquid full or with a gas phase and either at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present, and thus remove the heat of reaction. In any event, adequate means should be provided for dissipating the exothermic heat of polymerization, e.g. by cooling reactor walls, etc. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent, of any is employed. No further removal of impurities is required. Thus, a significant advantage of the present invention is the elimination of the catalyst residue removal steps and minimize contamination of the polymer with corrosive chloride residues. In some instances, however, it may be desirable to add a small amount of a catalyst deactivating reagent. The resultant polymer is found to contain insignificant amounts of catlyst residue.

The following examples are given to illustrate the invention, and should not be construed as limiting its scope. All parts and percentages are by weight unless otherwise indicated.

In the following examples, the melt index values, $I_2$, were determined by ASTM D 1238, condition E. The apparent bulk density was determined as an unsettled bulk density according to the procedure of ASTM 1895 employing a paint volumeter from the Sargent-Welch Scientific Company (catalog no. S-64985) as the cylinder instead of the one specified by the ASTM procedure.

GENERAL PROCEDURE

In each of the following examples, the catalyst components were blended while in a gloved box filled with nitrogen unless otherwise indicated. In the examples, the dibutylmagnesium was a commercial material obtained from the Lithium Corporation of America. All ratios are molar ratios unless otherwise indicated.

A. CATALYST PREPARATION

In a glass beaker equipped with a stirrer, the required quantity of 0.769 molar dibutylmagnesium in heptane solution was diluted with hexane to a total volume of two-hundred milliliters. With stirring, to this mixture was added the required amount of diol, and the mixture was diluted to a total volume of four-hundred milliliters. A one-to-one mole ratio of diol to magnesium was employed. The mixture was stirred for several hours. While stirring, the required amount of titanium tetrachloride was added dropwise. The resulting mixture, which now contained a solid phase, was stirred an additional half-hour. Thereafter, the solid phase was allowed to settle out, and the liquid phase was decanted off. Fresh hexane was then added to the settled solid, the mixture was stirred, and the decantation procedure was repeated three times.

B. POLYMERIZATION OF ETHYLENE

To a one-liter stirred steel reactor, which was free of oxygen and water, was added six-hundred milliliters of dry, oxygen-free hexane, the required amount of catalyst, and the required amount of triisobutylmagnesium in a hydrocarbon diluent. The pressure of the reactor was raised to 30 psig with hydrogen gas, and the temperature of the reactor to 85° C. Thereafter more hydrogen was added, to raise the pressure to between seventy and ninety psig, and sufficient ethylene to give a total pressure of 170 psig, which pressure was maintained for two hours by supplying ethylene as required. The reactor was then cooled to ambient temperature, vented, and the polyethylene product was recovered.

The results thus obtained are shown below in Table I, wherein $I_2$ is a quantity determined as in ASTM Standard D 1238, Condition E; and $I_{10}$ a quantity determined as in ASTM Standard D 1238, Condition N. In general, the greater the $I_{10}/I_2$ ratio, the broader the molecular weight distribution.

TABLE I

| EXAMPLE NUMBER OR COMPARATIVE EXPERIMENT LETTER | $I_2$ | $I_{10}/I_2$ | DIOL | Mg/Diol MOLE RATIO |
|---|---|---|---|---|
| 1 | 0.10 | 15.10 | A[1] | 1/1 |
| 2 | 0.13 | 14.02 | A | 1/1 |
| 3 | 0.15 | 13.20 | A | 1/1 |
| 4 | 1.00 | 13.20 | A | 1/1 |
| 5 | 0.55 | 11.33 | B[2] | 1/1 |
| 6 | 0.56 | 10.88 | B | 1/1 |
| 7 | 0.41 | 9.40 | C[3] | 1/1 |
| A | 0.53 | 8.64 | D[4] | 1/1 |

[1]The diol was 2-methyl-2,4-pentanediol.
[2]The diol was 1,8-octanediol.
[3]The diol was 1,6-hexanediol.
[4]An eight carbon atom alkanol, 1-octanol was employed for comparative purposes.

While certain representative embodiments and details have been shown for the purpose of illustrating the present invention, it will be apparent to those skilled in the art that various changes and modifications can be made therein without departing from the spirit and scope of the invention.

I claim:

1. A process for the polymerization of an α-olefin or mixtures thereof under conditions characteristic of Ziegler polymerization wherein the polymerization is conducted in the presence of
   (I) a supported catalyst which is the solid, hydrocarbon insoluble reaction product formed by reacting in an inert diluent
   (1) the reaction product of
      (a) a magnesium component or mixture of such components represented by the formula $MgR_2 \cdot xMeR'_{x'}$, wherein each R is independently a hydrocarbyl group having from 1 to about 20 carbon atoms, each R' is independently a hydrocarbyl or a hydrocarbyloxy group having from 1 to about 20 carbon atoms, Me is aluminum, zinc or boron, x has a value of from zero to about 10 and x' has a value equal to the valence of Me; with (b) a sufficient amount of at least one diol having at least six carbon atoms wherein there are from three to about eight carbon atoms between the hydroxyl groups of said diol(s); and wherein the mole ratio of component (1-a) to (1-b) is about 1:1; with (2) a halide-containing transition metal compound or mixture thereof represented by the formula $TmY_nX_{z-n}$ wherein Tm is a metal selected from groups IV-B, V-B and VI-B of the Periodic Table of Elements, Y is oxygen or OR", each X is a halogen, each R" is independently a hydrocarbyl group having from 1 to about 20 carbon atoms, z has a value equal to the valence of said transition metal, n has a value of from zero to 6 with the value of z−n being from at least 1 up to a value equal to the valence of the transition metal; said halide-containing transition metal being present in a quantity so as to convert substantially all of the substituent groups attached to a magnesium atom in component (1) to a halide group; and (II) an activating agent therefor wherein components (I) and (II) are
 (a) added separately to one or more polymerization reactor(s) or zone(s);
 (b) mixed together just prior to addition to one or more polymerization reactor(s) or zone(s); or
 (c) reacted together before addition to one or more polymerization reactor(s) or zone(s).

2. A process of claim 1 wherein in component (I-a) each R and R' is independently an aliphatic hydrocarbon group having from 1 to 10 carbon atoms; Me is aluminum and wherein said inert diluent is a hydrocarbon or mixture of hydrocarbons having from about 4 to about 10 carbon atoms and component II is represented by the formulas $AlR^3{}_{3-m}X_m$, $MgR^3{}_2$, $MgR^3X$, $ZnR^3X$ or $ZnR^3{}_2$ wherein each $R^3$ is a hydrocarbyl group having from 1 to about 20 carbon atoms, X is a halogen or a hydrocarbyloxy group having from 1 to about 20 carbon atoms, m has a value from zero to 2; said activating agent being present in a quantity sufficient to provide an Al, Mg and/or Zn:Tm atomic ratio of from about 1:1 to about 5000:1.

3. A process of claim 2 wherein the value of x and each R and R' is such that the magnesium compound is soluble in said hydrocarbon or mixture of hydrocarbons and component II is represented by the formula $AlX_mR^3{}_{3-m}$ wherein each $R^3$ is a hydrocarbyl group having from 1 to about 10 carbon atoms, m has a value of zero or 1 and the Al:Tm atomic ratio is from about 5:1 to about 1000:1.

4. A process of claim 3 wherein the value of x and each R and R' is such that the reaction product (1) is soluble in said indert diluent and in component II each $R^3$ is an aliphatic hydrocarbon and the Al:Tm atomic ratio is from about 10:1 to about 400:1.

5. A process of claim 4 wherein in component I X is chlorine and n has a value of zero and Tm is titanium and component II is triisobutyl aluminum.

6. A process of claim 5 wherein said magnesium component is selected from the group consisting of dibutylmagnesium.½ trisobutylaluminum, dihexylmagnesium.½ triisobutylaluminum, butylethylmagnesium.½ triisobutylaluminum, butyloctylmagnesium.½ triisobutylaluminum and mixtures thereof.

7. A process of claims 1, 2, 3, 4, 5 or 6 wherein component (1-b) is selected from the group consisting of 1,8-octanediol, 2-methyl-2,4-pentanediol or mixtures thereof.

8. A process of claims 1, 2, 3, 4, 5 or 6 wherein ethylene or a mixture of ethylene and at least one other polymerizable ethylenically unsaturated monomer is polymerized.

9. A process of claim 8 wherein ethylene or a mixture of ethylene and at least one α-olefin having from 3 to about 10 carbon atoms is polymerized.

10. A process of claim 9 wherein ethylene or a mixture of ethylene and at least one of butene-1, hexene-1 or octene-1 is polymerized.

11. A process of claim 7 wherein ethylene or a mixture of ethylene and at least one other polymerizable ethylenically unsaturated monomer is polymerized.

12. A process of claim 11 wherein ethylene or a mixture of ethylene and at least one α-olefin having from 3 to about 10 carbon atoms is polymerized.

13. A process of claim 12 wherein ethylene or a mixture of ethylene and at least one of butene-1, hexene-1 or octene-1 is polymerized.

14. A process of claims 1, 2, 3, 4, 5 or 6 wherein components I and II are reacted together prior to contact with any monomer(s) to be polymerized.

15. A process of claims 1, 2, 3, 4, 5 or 6 wherein components I and II are fed as separate streams to a polymerization reactor or are mixed together just prior to contact with any polymerizable monomer(s).

16. A process of claim 7 wherein components (I) and (II) are reacted together prior to contact with any of the polymerizable monomer(s).

17. A process of claim 7 wherein components I and II are fed as separate streams to a polymerization reactor or are mixed together just prior to contact with any polymerizable monomer(s).

* * * * *